(12) United States Patent
Boddy et al.

(10) Patent No.: US 7,726,624 B2
(45) Date of Patent: Jun. 1, 2010

(54) MOUNTING SYSTEM FOR VEHICULAR MIRROR

(75) Inventors: Ian Boddy, Ada, MI (US); Peter John Ellis, Rochester Hills, MI (US)

(73) Assignee: Magna Mirrors of America, Inc., Kentwood, MI (US)

( * ) Notice: Subject to any disclaimer, the term of this patent is extended or adjusted under 35 U.S.C. 154(b) by 1226 days.

(21) Appl. No.: 10/522,446

(22) PCT Filed: Jul. 14, 2003

(86) PCT No.: PCT/US03/21885

§ 371 (c)(1),
(2), (4) Date: Jan. 19, 2005

(87) PCT Pub. No.: WO2004/009407

PCT Pub. Date: Jan. 29, 2004

(65) Prior Publication Data

US 2005/0248168 A1    Nov. 10, 2005

Related U.S. Application Data

(60) Provisional application No. 60/319,407, filed on Jul. 19, 2002.

(51) Int. Cl.
*A47G 1/16* (2006.01)
(52) U.S. Cl. .................. 248/476; 248/475.1; 248/477
(58) Field of Classification Search .............. 248/475.1, 248/466, 476, 479, 480, 481
See application file for complete search history.

(56) References Cited

U.S. PATENT DOCUMENTS

| | | | |
|---|---|---|---|
| 1,861,148 A | 5/1932 | Withrow | |
| 2,259,179 A | 10/1941 | Sauer | |
| 4,253,633 A | 3/1981 | Takegawa | |
| 4,936,537 A | 6/1990 | Namba et al. | |
| 5,669,704 A * | 9/1997 | Pastrick | 362/494 |
| 6,039,449 A | 3/2000 | Dolan et al. | |
| 6,116,743 A * | 9/2000 | Hoek | 359/871 |
| 6,213,609 B1 * | 4/2001 | Foote et al. | 359/841 |
| 6,239,928 B1 * | 5/2001 | Whitehead et al. | 359/871 |
| 6,276,808 B1 * | 8/2001 | Foote et al. | 359/877 |
| 6,390,635 B2 * | 5/2002 | Whitehead et al. | 359/872 |
| 7,195,382 B1 * | 3/2007 | Foote | 362/494 |
| 7,270,430 B2 * | 9/2007 | Olijnyk et al. | 359/841 |
| 2001/0015862 A1 | 8/2001 | Lynam et al. | |

FOREIGN PATENT DOCUMENTS

| | | |
|---|---|---|
| EP | 0186366 | 7/1986 |
| EP | 0512440 | 11/1992 |
| EP | 0979757 | 2/2000 |
| GB | 1202574 | 8/1970 |

* cited by examiner

*Primary Examiner*—Amy J Sterling
*Assistant Examiner*—Steven M Marsh
(74) *Attorney, Agent, or Firm*—McGarry Bair PC (57) ABSTRACT

The invention provides improvements to an external vehicle mirror assembly. The pivot point is located at an outboard side of the mirror housing. The power pack is mounted at an inboard side of the mirror housing. The mirror case is molded with no obstructions in a recessed base for holding the mirror, and the pivotable socket is molded at one side of the mirror case. The mirror assembly is mounted to the vehicle through an improved mounting mechanism. Trim seals seal the mirror assembly to the vehicle with improved wind noise, moisture, and dust resistance, and fewer components.

20 Claims, 12 Drawing Sheets

MOUNTING SYSTEM FOR VEHICULAR MIRROR

CROSS-REFERENCE TO RELATED APPLICATIONS

This application claims priority on international Application No. PCT/US03/21885, filed Jul. 14, 2003, which claims the benefit of U.S. Provisional Patent Application 60/319,407, filed Jul. 19, 2002.

BACKGROUND OF THE INVENTION

1. Field of Invention

The invention relates to external vehicle mirrors and, more particularly, to improvements related to reducing costs of manufacture.

2. Description of the Related Art

External mirrors are ubiquitous for contemporary vehicles and have long been used to aid the driver in operating the vehicle, especially in improving the rearward view of the driver. Most have a structure similar to that shown in the prior art vehicle mirror 10 illustrated in FIG. 1, comprising a mirror assembly 12 pivotally mounted to a support base 14. The support base 14 includes a support arm 16 carrying a post 18 with a central aperture 20, and a mounting panel 17 for mounting the mirror 10 to the vehicle. The mirror assembly 12 includes a mirror housing 22 having a pin 24 adapted to be received in the central aperture 20. The pin 24 is retained therein by a spring 26 and a push nut 28. Access to the foregoing is provided by a removable door 30.

Figure 1:
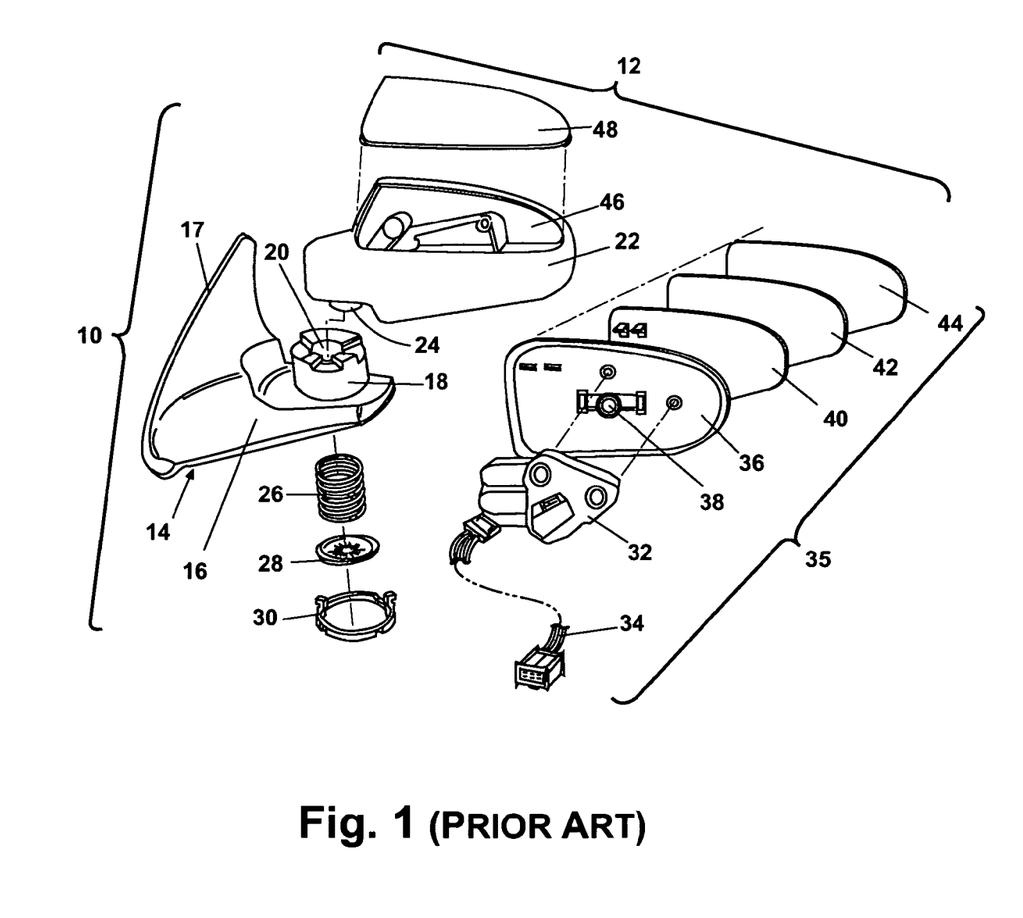
FIG. 1 is an exploded view of a prior art vehicle mirror.

The mirror housing 22 is hollow and contains a power pack 32 which receives power by way of a wiring harness 34. A reflective element assembly 35 comprises a mirror case 36 which is pivotally mounted to the power pack 32 at a pivot point 38 for rotation about two orthogonal axes. The reflective element assembly 35 can also comprise a heater 40, or in the absence of the heater a support pad 42, optionally mounted to the mirror case 36. A reflective element 44 is mounted to the mirror case 36, and the entire assembly of the power pack 32, the mirror case 36, and reflective element 44 is mounted inside the mirror housing 22. The working components of the mirror assembly 12 inside the mirror housing 22 are accessible through an opening 46 in the mirror housing 22, which opening is normally covered by a skull cap 48.

Problems inherent with existing designs for external vehicle mirrors such as that illustrated in FIG. 1 include the cost of materials, the time for manufacture and assembly, and the accuracy of fit and finish. There is a need for improvements to reduce costs, to minimize time for manufacture, to make assembly easier, and to streamline fit and finish.

SUMMARY OF THE INVENTION

The invention provides several improvements in the design of a vehicle mirror that result in less mass, less material costs, shorter manufacturing time, and easier assembly. Among the improvements is an improved mirror case that relocates the pivot point of the mirror closer to the outboard edge of the mirror housing. In addition, the power pack has been relocated closer to the inboard edge of the mirror housing. As a result, the size and shape of the mirror housing can be altered to result in less mass and less material.

In another aspect of the invention, the support arm incorporates an integral lip seal eliminating a need for a separate gasket when mounting the vehicle mirror to the vehicle. Another improvement in mounting the vehicle mirror is found in the mirror base plate where pockets are provided to help locate the mirror on the vehicle and eliminate mounting bolts.

In a further aspect of the invention, the skull cap is redesigned with a thinner wall to provide a spring fit to the mirror housing.

In another aspect, the invention relates to a side-mounted rearview mirror assembly comprising a mirror housing enclosing a mirror case supporting a reflective element and a support base having a mounting panel for mounting the mirror, at least one hook assembly extending from the mounting panel configured to engage at least one socket mounting the mirror assembly to a vehicle by translating said mounting panel relative to said at least one socket, and a resilient seal assembly extending along at least a portion of the perimeter of the support base for engaging the vehicle.

In a further aspect, the invention relates to a vehicular mirror mounting system for mounting a vehicular mirror to a side panel of a vehicle comprising: a mirror mounting panel adapted to receive a mirror head with a reflective element mounted therein, the mirror mounting panel having one of a flange and a socket directed in a forward direction with respect to a direction of travel of the vehicle; a vehicle side panel having the other of a flange and a socket directed in a rearward direction with respect to a direction of travel of the vehicle; wherein the flange is adapted to be slidably received within the socket when the flange and socket are operably aligned with one another and the mirror mounting panel is moved forwardly with respect to the vehicle side panel so that the flange is received within the socket.

In another aspect, the invention relates to 23. A system for mounting a vehicular mirror to a side panel of a vehicle having a side panel mounting portion thereon comprising: a mirror mounting panel having a mirror mounting portion thereon; wherein the mirror mounting panel has at least one seal integrally formed with at least one peripheral edge thereof that forms an effective barrier against wind and water ingress when the mirror mounting panel is mounted to the vehicle side panel when the mirror mounting portion is received by the side panel mounting portion.

In yet another aspect, the invention relates to a mirror case for a vehicular rearview mirror assembly comprising a housing and a tilt mechanism attached at at least one attachment point to the mirror case for adjusting the orientation of the mirror case about two perpendicular axes, the mirror case having a pivot point spaced from the at least one attachment point at which the mirror case is mounted in the rearview mirror assembly to enable the mirror case to pivot about the two perpendicular axes but prevent the mirror case from translating along a third axis perpendicular to the two perpendicular axes, wherein the spacing between the pivot point and the attachment point of the tilt mechanism to the mirror case is maximized.

Various embodiments of the various aspects of the invention are also contemplated. The at least one hook assembly can comprise three hook assemblies and the at least one socket can comprise three sockets. At least one boss can extend from the mounting panel and at least one locator pad can extend from the side panel, the at least one boss being adapted for movement away from the side panel when the at least one boss is translated along the at least one locator pad as the mounting panel is translated along the side panel to mount the mirror to the vehicle.

The at least one hook assembly can comprise a pair of hooks. The resilient seal assembly can comprise a trim frame adapted for mounting over the support base when the mirror is mounted to the vehicle. The resilient seal assembly can comprise an integrated portion of the mounting panel. A support base cover assembly can be provided for covering the support base when the mirror is mounted to the vehicle. The support base cover assembly can comprise a base sleeve and a support base panel removable from the base sleeve. The mounting panel can be translated along the side panel toward the front portion of the motor vehicle.

The mirror case can further comprise a pivot point at an outboard end thereof for adjusting the horizontal and vertical tilt of the mirror case. A power pack can be mounted to an inboard end of the mirror case for adjusting the horizontal and vertical tilt of the mirror case about the pivot point. An access opening can be provided in the mirror housing for gaining access to the interior of the mirror housing and a flexible, removable door can be provided for covering the access opening.

At least one fastener can be provided for fixedly mounting the mirror mounting panel to the vehicle side panel. The at least one fastener can comprise at least one threaded fastener extending through aligned apertures in the mirror mounting panel and the vehicle side panel. At least one seal can be mounted to at least one peripheral edge of the mirror mounting panel. The at least one seal can be integrally formed with the mirror mounting panel. The at least one seal can comprise a flip seal. The at least one seal can form an effective barrier against wind and water ingress when the mirror mounting panel is mounted to the vehicle side panel when the flange is received within the socket. The socket can further comprise a locator pad positioned adjacent thereto.

A boss can be provided in spaced relationship to the flange. A locator pad can be provided in spaced relationship to the socket, wherein the locator pad is in register with the boss when the mirror mounting panel is mounted to the side panel to create tension therebetween to further secure the mounting between these components.

The mirror mounting portion and the side panel mounting portion can be adapted to be slidably engaged with one another to mount the mirror mounting panel to the side panel of the vehicle. The mirror mounting portion can be one of a flange and a socket. The side panel mounting portion can be the other of a flange and a socket. The flange can be mountable within the socket when the flange is slid forwardly in the direction of vehicle travel into the socket. The socket can further comprise a locator pad positioned adjacent thereto. A boss can be provided in spaced relationship to the flange. A locator pad can be provided in spaced relationship to the socket, wherein the locator pad is in register with the boss when the mirror mounting panel is mounted to the side panel to create tension therebetween to further secure the mounting between these components.

The pivot point can be located adjacent an outboard end of the mirror case. The attachment point of the tilt mechanism to the mirror case can be located adjacent an inboard end of the mirror case. The housing can comprise an access opening for gaining access to the interior of the housing and further comprises a flexible, removable door for covering the access opening.

DESCRIPTION OF THE INVENTION

Figure 2:
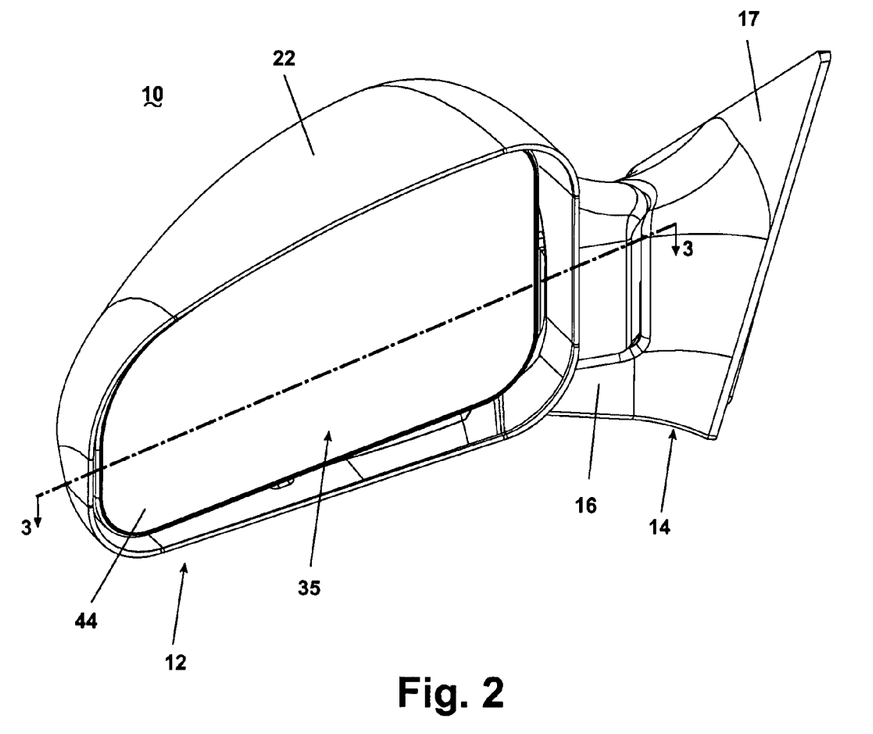
FIG. 2 is a close-up perspective view of a mirror assembly according to the invention.
Figure 15:
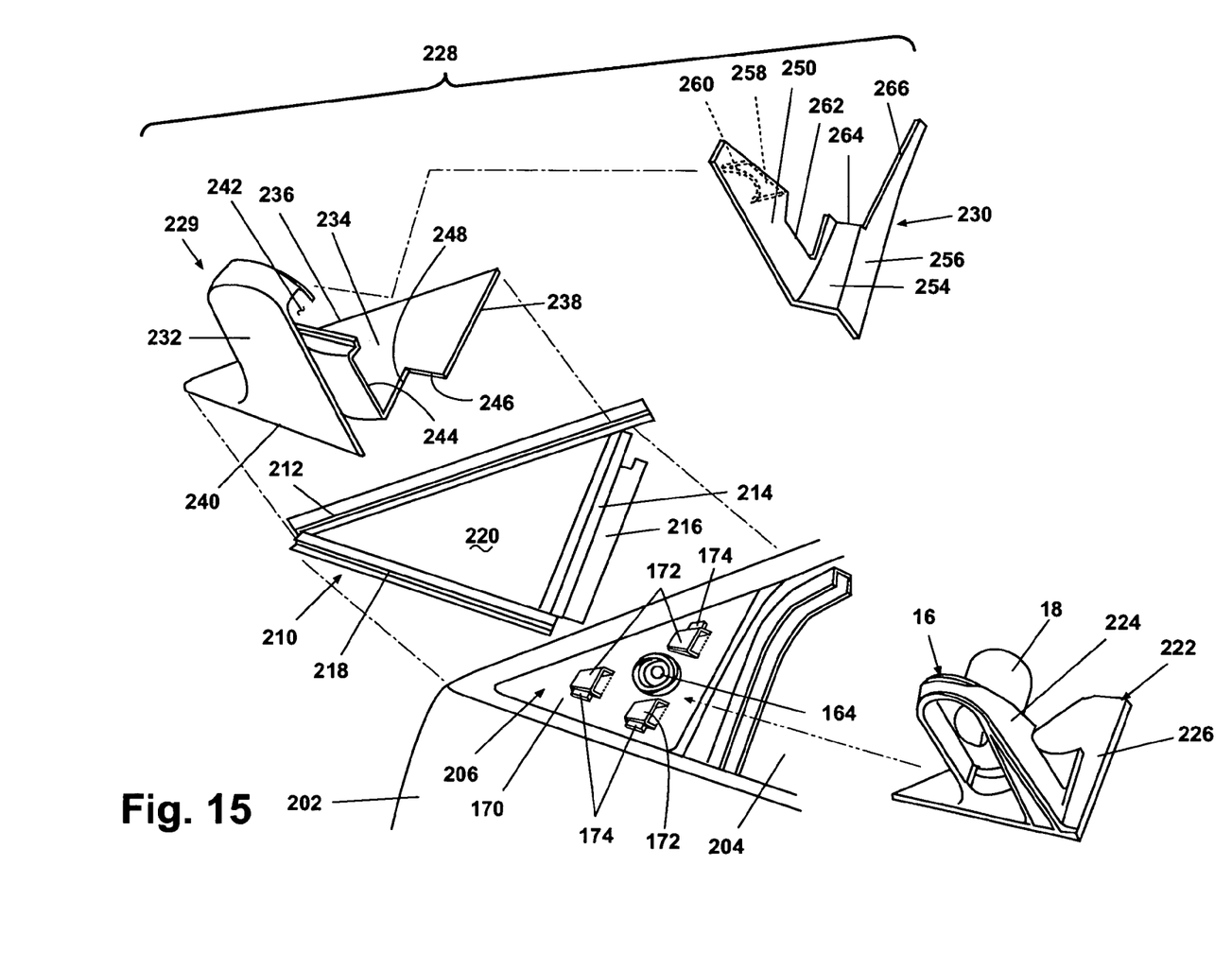
FIG. 15 is an exploded view of the improved mirror support arm shown in FIG. 11 and further including a support base sleeve and a trim frame for attaching the mirror support arm to a motor vehicle.

FIG. 2 illustrates a vehicle mirror 10 according to the invention for mounting to a motor vehicle not shown comprising a well-known door 202 having a window 204 and a triangular corner panel 206 (FIG. 15). The vehicle mirror 10 comprises a mirror assembly 12 according to the invention which shares many features of the prior art assembly shown in FIG. 1. Thus, the mirror assembly 12 according to the invention comprises a support base 14, a support arm 16, a mounting panel 17, a post 18, and a housing 22, enclosing a reflective element assembly 35. A first embodiment of the invention comprises an improved mirror case 50 (FIG. 3).

Figure 3:
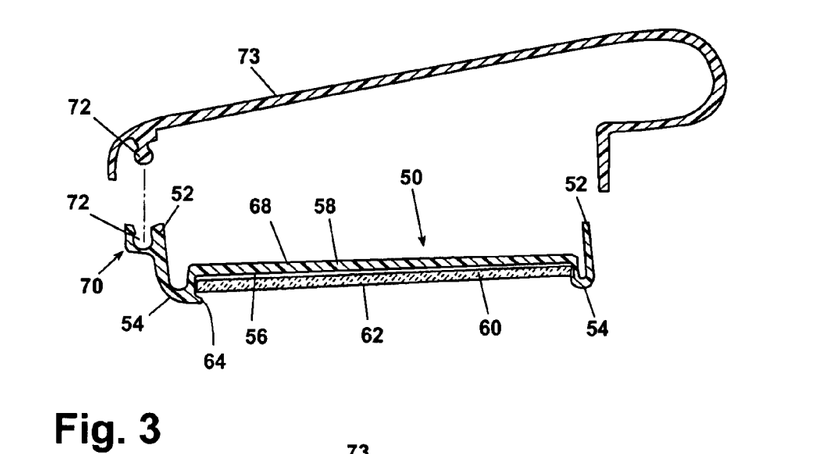
FIG. 3 is a partially exploded cross-sectional view of a mirror case for installation in an improved housing according to the invention, taken along line 3-3 of FIG. 2.
Figure 4:
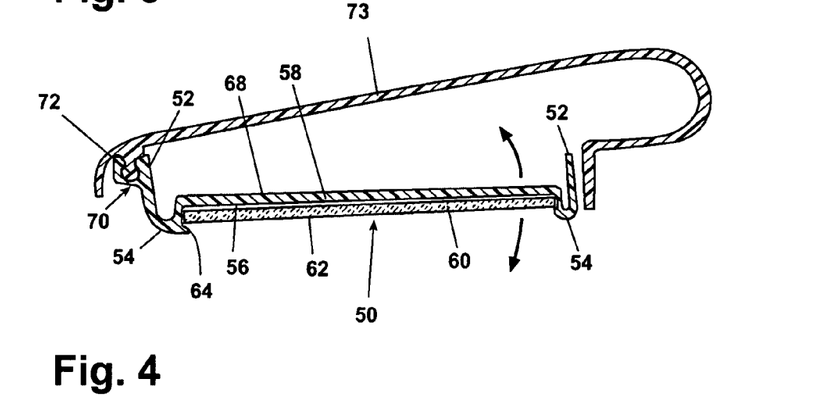
FIG. 4 is a cross-sectional view of the mirror case as shown in FIG. 3 installed in the improved housing according to the invention.
Figure 5:
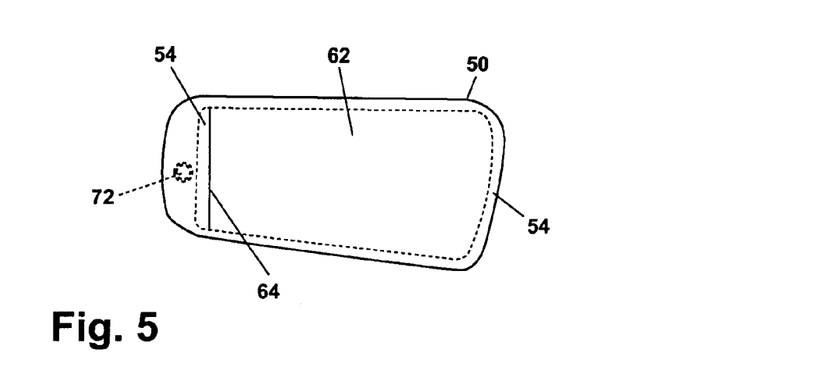
FIG. 5 is an elevational view of the mirror case and mirror shown in FIG. 3.

FIGS. 3-5 illustrate the mirror case 50 according to the invention. The mirror case 50 is a generally irregularly-shaped body preferably comprising a molded polymer such as thermoplastic, having a generally cup shape comprising a rim 52 and an annular rib 54. A recess 56 within the annular rib 54 is roughly the desired shape of a reflective element or mirror 44 and has a flat, unobstructed base 58. The mirror surface 60 of the base 58 can be imprinted with a reflective coating in a known manner to form the reflective element 44. Transparent glass 62 can then be used to cover the reflective coating. Alternatively, a mirror with its own reflective coating can be secured to the base 58 within the recess 56 in a well-known manner. Tabs 64 molded into the annular rib 54 can retain the reflective element 44 in the recess 56 in a snap-fit relationship. It is preferable that the reverse side 68 of the base 58 also be unobstructed to enable sufficient space to mount additional components in the mirror housing 22.

A socket 70 extends outwardly from the rim 52 to provide a pivot point 72 near the outside edge of the reflective element 44. It will be understood that the pivot point 72 can be located inwardly of the rim 52, but it is preferable for the pivot point 72 to be as far away from the support base 14 as the design will permit, as shown in FIGS. 3 and 5.

As a result of locating the pivot point 72 at the edge of the mirror case 50, a shallower mirror housing 73 can be utilized, as shown in FIG. 3. Rotation of the mirror case 50 about a pivot point closer to the center of the mirror case 50, such as the prior art mirror case 36 shown in FIG. 1, means that both edges of the mirror case would rotate through vertical angles. Hence, both sides of the mirror housing must be deep enough to accommodate that rotation. In the assembly shown in FIG. 3, where the pivot point 72 is located at one side of the housing 73, the housing 73 can be shallower at that location.

Figure 6:
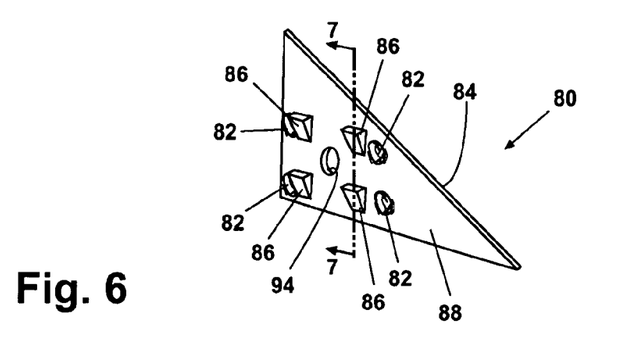
FIG. 6 is a perspective view of a mirror base plate according to the invention.
Figure 7:
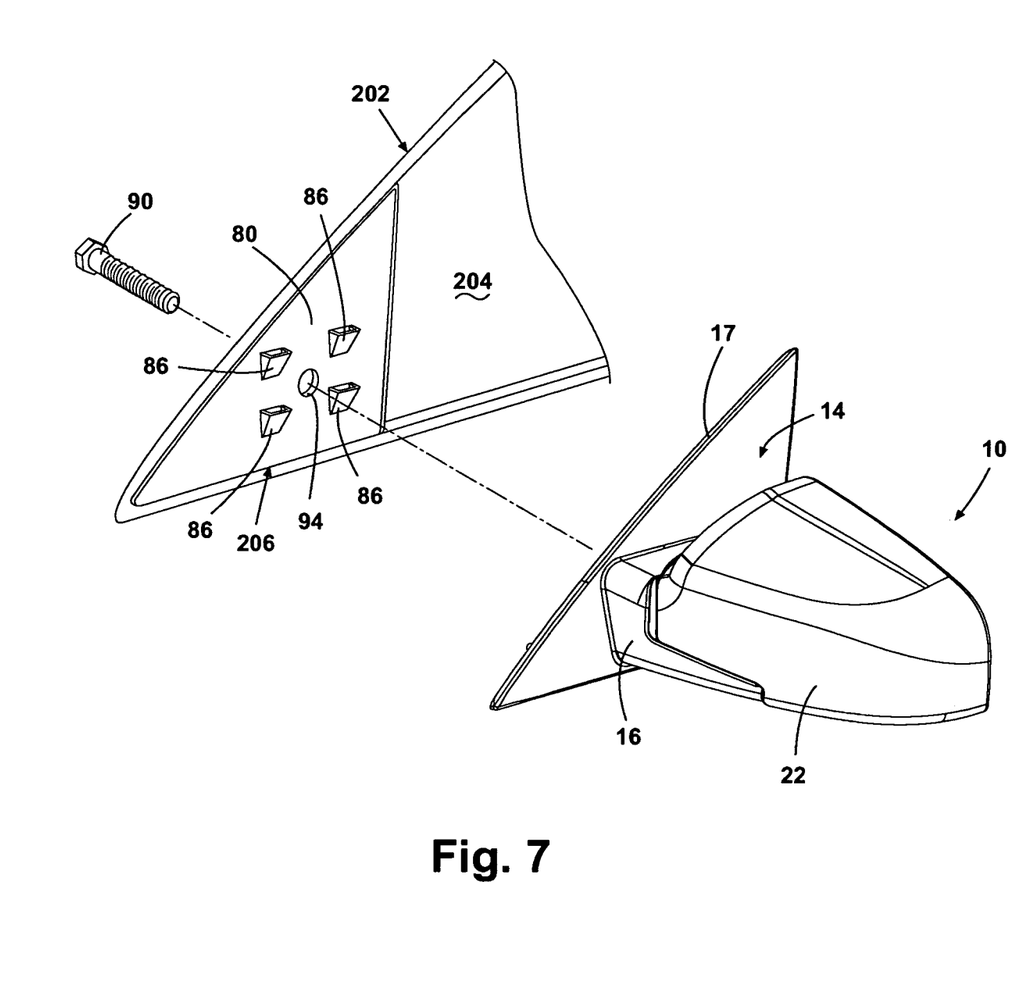
FIG. 7 is an exploded view of the mirror assembly shown in FIG. 2 illustrating the mirror base plate of FIG. 6 and the attachment of the mirror assembly to the mirror base plate.
Figure 7A:
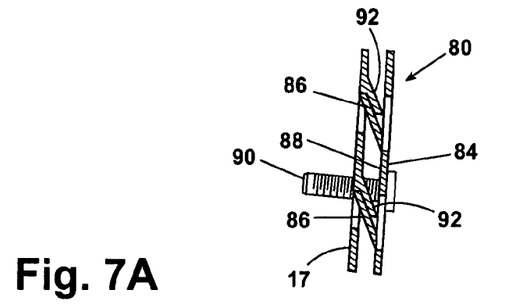
FIG. 7A is a cross-sectional view of the mirror base plate taken along line 7-7 of FIG. 6.

FIGS. 6, 7 and 7A illustrates the mirror assembly of FIGS. 2-5 with an improved mirror base plate 80 which is adapted for mounting at the corner panel 206. The base plate 80 can comprise a series of depressions 82 projecting from the plate 80 on the vehicle side 84. Four pockets formed by tabs 86 extending outwardly from the mirror side 88 of the plate 80 help locate the mirror and hold it while a fixing bolt 90 passing through an aperture 94 in the base plate 80 into the mirror support base 17 secures the mirror to the vehicle. In addition, tabs 92 on the mirror support base 17 complementary in configuration and position to the pockets and tabs 86 permit the tabs 92 to be hooked on the pockets 86 to hold the mirror in place while further securement is provided. Alternatively, the "hooks" can be adapted to permanently secure the mirror support base 17 to the base plate 80, thereby providing means to attach the mirror to the vehicle without a fixing bolt.

Figure 8:
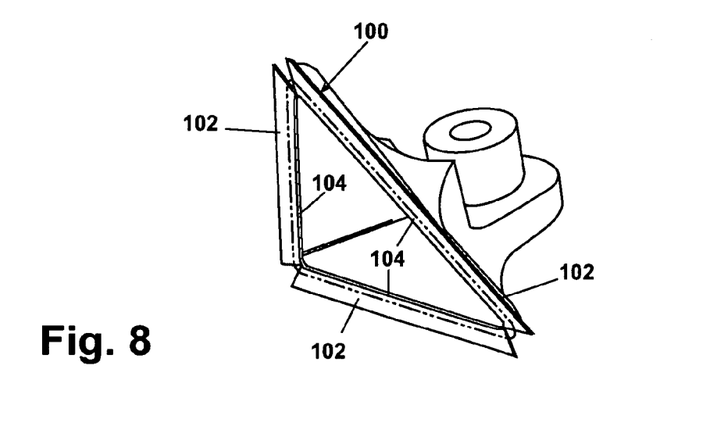
FIG. 8 is a perspective view of a first embodiment of an improved mirror support arm according to the invention.

FIG. 8 shows a mirror support arm 100 having an integrally formed lip seal 102 around its peripheral edges 104. Such a lip seal 102 will render a separate gasket unnecessary when installing the mirror to a vehicle.

Figure 9:
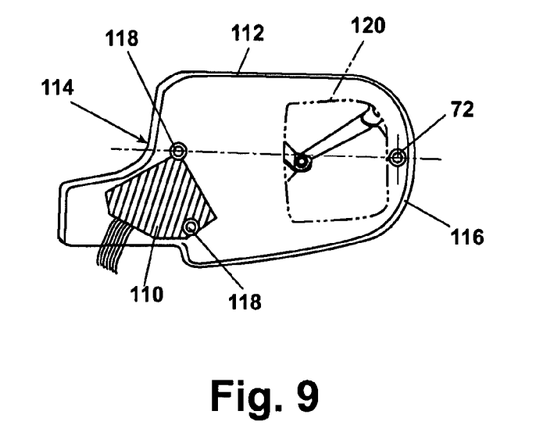
FIG. 9 is a schematic view of an improved location of a power pack in the mirror housing according to the invention.

FIG. 9 shows an improved location for a power pack 110 in a mirror housing 112 having inboard 114 and outboard 116 sides. Preferably, the power pack 110 is positioned in the housing inboard side 114 by clips 118. With the pivot point 72 located at the outboard side 116 of the housing 112, the power pack can impart motion to the mirror case 50 from the inboard side 114 so that it will rotate about the two axes remote from the pivot point. The inboard side 114 is typically the strongest area of the housing 112 and is where the most room is available for the power pack. Any access to the interior of the housing 112 can be provided by an access opening normally closed by a skull cap 120 toward the outboard side 116.

Figure 10:
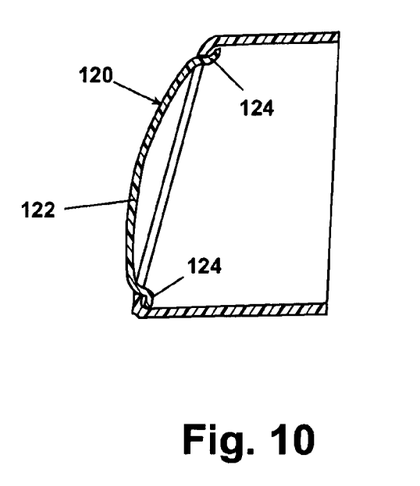
FIG. 10 is a cross-sectional view of an improved skull cap according to the invention.

FIG. 10 illustrates an improved skull cap 120 comprising a relatively thin molded wall 122, enabling it to bend. At the peripheral edges are tabs 124 peripherally extending or spaced about the cap 120 that can engage the peripheral edge of an opening in the mirror housing to hold the skull cap over the opening by spring fit.

FIGS. 11-14 illustrate an embodiment of a support base 130 having an improved assembly for mounting the support base 130 to the corner panel 206 of the door 202. A mirror base cover encloses the mounted support base as described hereinafter.

Figure 11:
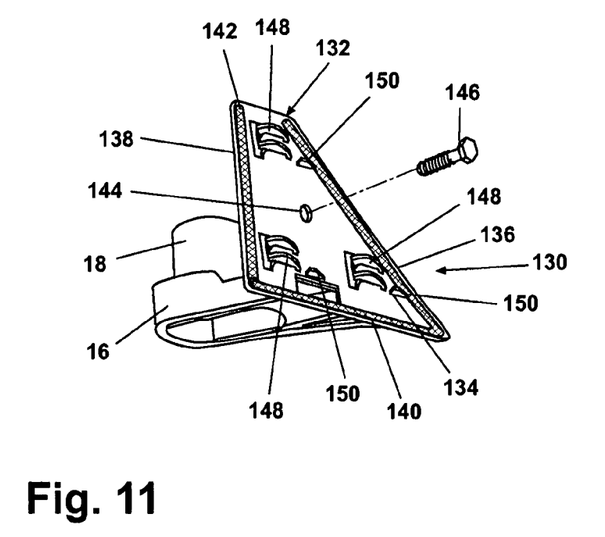
FIG. 11 is a perspective view of a second embodiment of an improved mirror support arm having an improved mirror attachment mechanism and a first seal configuration according to the invention.

As shown in FIG. 11, the support base 130 comprises a support arm 16 and a mounting panel 132. The mounting panel 132 is a generally trapezoid-shaped panel having an inner face 134 which is adapted for juxtaposed cooperation with the corner panel 206. The mounting panel 132 comprises an inclined edge 136, a vertical edge 138, and a bottom edge 140 extending therebetween. The mounting panel 132 is provided with a mounting aperture 144 therethrough which is adapted to receive a threaded fastener 146, such as a machine screw or a bolt, for attaching the support base 130 to the corner panel 206 by threading the threaded fastener 146 into a mating threaded receptacle 164 (FIG. 15) in the corner panel 206.

Figure 13:
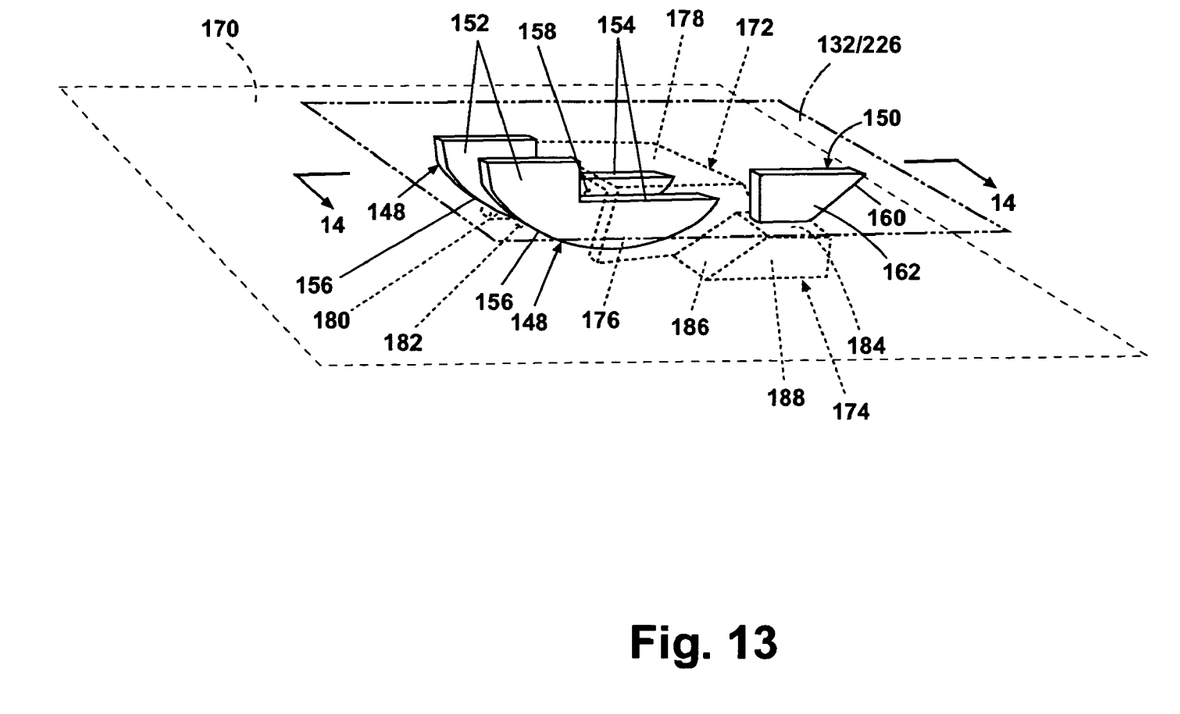
FIG. 13 is a close-up view of the mirror attachment mechanism shown in FIG. 11.
Figure 14:
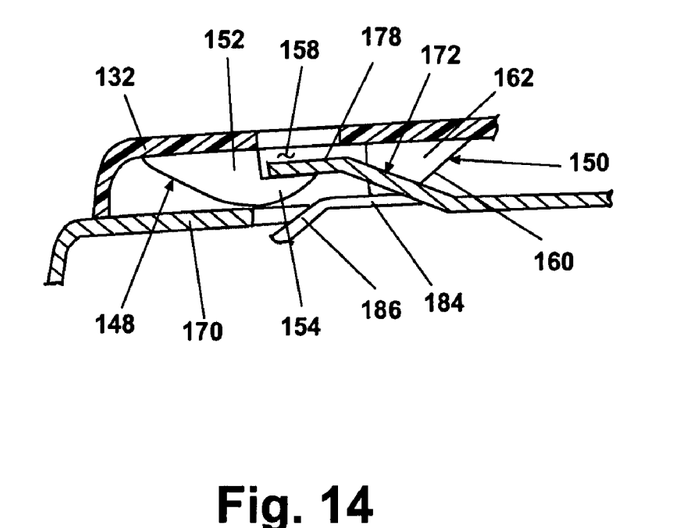
FIG. 14 is a cross-sectional view of the mirror attachment mechanism taken along line 14-14 of FIG. 13.

Referring also to FIGS. 13 and 14, the mounting panel 132 is provided with a plurality of hooks 148 extending away from the inner face 134. Preferably, the hooks 148 are provided in three pairs in generally parallel, spaced-apart juxtaposition. Each hook 148 extends from the inner face 134 through a base portion 152 which transitions to a cantilevered finger portion 154 to form a slot 158 between the inner face 134 and the finger portion 154. The base portion 152 and the finger portion 154 comprise an arcuate edge 156.

Spaced somewhat away from the finger portion 154 is a boss 150 extending away from the inner face 134. The boss 150 is a generally a rectilinear protrusion having an inclined portion 160 and a straight portion 162. The boss 150 forms a ramp-like structure adjacent to the hooks 148.

As shown in FIGS. 14 and 15, the corner panel 206 comprises an outwardly-facing mounting surface 170. A plurality of sockets 172 extending away from the mounting surface 170 are adapted for operable communication with the hooks 148. The sockets 172 comprise a pair of spaced-apart sidewalls 176 joined by a top wall 178 in generally parallel juxtaposition to the mounting surface 170. The sidewalls 176, the top wall 178, and the mounting surface 170 define an opening 180 leading to a receptacle 182 adapted for receipt of the hooks 148. Adjacent each socket 172 is a locator pad 174 extending away from the mounting surface 170. The locator pad 174 is a generally rectilinear body comprising a straight portion 184, an inclined portion 186, and a side wall 188. The inclined portion 186 extends from the mounting surface 170 to the straight portion 184 in the direction of the opening 180.

As shown in detail in FIG. 14, the hooks 148 and the sockets 172 operably communicate to securely attach the support base 130 to the corner panel 206. The support base 130 is aligned with the corner panel 206 so that, as the inner face 134 is translated relative to the mounting surface 170, the hooks 148 will be inserted into the sockets 172 so that the top wall 178 is received in the slot 158. At the same time, the boss 150 will translate relative to the locator pad 174 so that the inclined portion 160 will travel along the inclined portion 186 and the straight portion 162 will contact the straight portion 184. As can be seen in FIG. 14, with the straight portion 162 in contact with the straight portion 184, the inner face 134 will be urged away from the mounting surface 170, thereby urging the finger portion 154 against the top wall 178, and providing a tight connection between the support base 130 and the corner panel 206.

The support base 130 is then secured to the corner panel 206 by the threaded fastener 146.

Referring again to FIG. 15, an alternate embodiment of the support base 14, identified with the reference character 222, is illustrated having a support base cover 228 for enclosing the support base 222 and providing a finished appearance to the mirror assembly 12. The support base 222 comprises a support arm 224 and a mounting panel 226 (also identified as mounting panel 132) generally as previously described herein. The support base cover 228 comprises a base sleeve 229 and a support base panel 230, which operably communicate to enclose the support base 222.

The base sleeve 229 is an irregularly shaped body comprising a support arm sleeve 232 and a mounting panel cover 234. The mounting panel cover 234 is a generally plate-like, triangular member adapted to cover the mounting panel 226 and to matingly communicate with the mounting surface 170. The mounting panel cover 234 comprises an inclined edge 236, a vertical edge 238, and a bottom edge 240 which is generally orthogonal to the vertical edge 238. The vertical edge 238 terminates at a lateral edge 246 extending orthogonally from the vertical edge 238 toward the inclined edge 236, in generally parallel, spaced-apart relationship to the bottom edge 240. The lateral edge 246 terminates at an intermediate edge 248 extending toward the bottom edge 240 in generally parallel, spaced-apart relationship to the vertical edge 238. The support arm sleeve 232 is an irregularly shaped, hollow member adapted to enclose the support arm 224 and extending generally orthogonally outwardly from the mounting panel cover 234. The support arm sleeve 232 is provided with a semi-arcuate post opening 242 adapted to receive the post 18. An upper surface of the support arm sleeve 232 terminates in a slot edge 244 extending generally orthogonally from the intermediate edge 248.

The support base panel 230 is an irregularly shaped member adapted for operable communication with the base sleeve 229, and comprising a side panel 250, an intermediate panel 254, and an elongated panel 256. The side panel 250 is a generally rectilinear plate-like portion having a channel edge 262 at an upper portion adapted for cooperative communication with the slot edge 244. The intermediate panel 254 is an elongated, rectilinear, plate-like portion extending generally orthogonally from the side panel 250 and having an intermediate edge 264 at an upper end adapted for cooperative communication with the lateral edge 246. The elongated panel 256 is an elongated, rectilinear, plate-like portion extending generally orthogonally from the intermediate panel 254 away from the side panel 250 and having a long edge 266 adapted for cooperative communication with the vertical edge 238.

A post bracket 258 is a generally C-shaped, plate-like member having an arcuate edge 260. The post bracket 258 extends generally orthogonally from an upper edge of the side panel 250 and is adapted for insertion into the post opening 242 when the support base panel 230 is brought into cooperative communication with the base sleeve 229. As so assembled, the arcuate edge 260 will lie in a plane with the arcuate edge of the post opening 242 to form a circular opening having a diameter generally corresponding to the diameter of the post 18.

The support base cover 228 is assembled by attaching the support base panel 230 to the base sleeve 229 so that the channel edge 262 is in contact with the slot edge 244, the intermediate edge 264 is in contact with the lateral edge 246, and the long edge 266 is in contact with the vertical edge 238. The support base 222 is first inserted into the base sleeve 229 prior to the attachment of the support base panel 230. After assembly of the support base panel 230 to the base sleeve 229, the support base 222 will be completely enclosed within the support base cover 228 with the post 18 extending through the post opening 242. The support base panel 230 can be secured to the base sleeve 229 through well-known means, such as a snap fitting, spot welding, adhesives are, and the like, although a snap fitting is preferred for ready removal of the support base panel 230 from the base sleeve 229 as desired.

In an alternate configuration, the support base panel 230 can be attached to the base sleeve 229 through a living hinge connecting the elongated panel 256 to the vertical edge 238. After enclosing the support base 222 in the base sleeve 229, the support base panel 230 can be secured against the base sleeve 229 with a suitable closure mechanism.

A trim frame 210 is a triangle shaped piece comprising seals for sealing the joints between the base sleeve 229 and the mounting surface 170, thereby preventing the migration of moisture and dirt between the base sleeve 229 and the mounting surface 170, and minimizing wind noise. The trim frame 210 comprises an inclined seal 212, a vertical seal 214, and a bottom seal 218, adapted for operable communication with the inclined edge 236, the vertical edge 238, and the bottom edge 240, respectively. The vertical seal 214 terminates in a seal flap 216. The seals 212-218 are preferably fabricated of a resilient polymeric material, such as a rubber, adapted to conform to the shape of the mounting surface 170 and the base cover 228, and having suitable strength and a resistance to weathering for the purposes intended. As shown in FIG. 14, the inclined seal 212 is adapted to overlie the inclined edge 236 of the support panel cover 234, and to seal the mounting surface 170 with a flip seal 270 extending from the inclined seal 212. The vertical seal 214 and the bottom seal 218 seal the base cover 228 to the mounting surface 170 in a similar manner.

Figure 12:
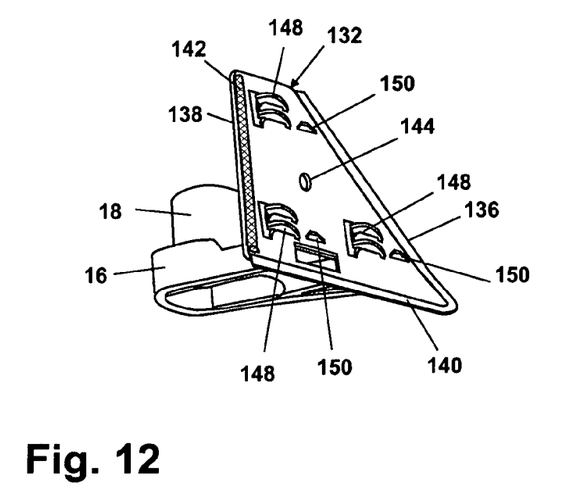
FIG. 12 is a perspective view of a second embodiment of an improved mirror support arm having an improved mirror attachment mechanism and a second seal configuration according to the invention.
Figure 16:
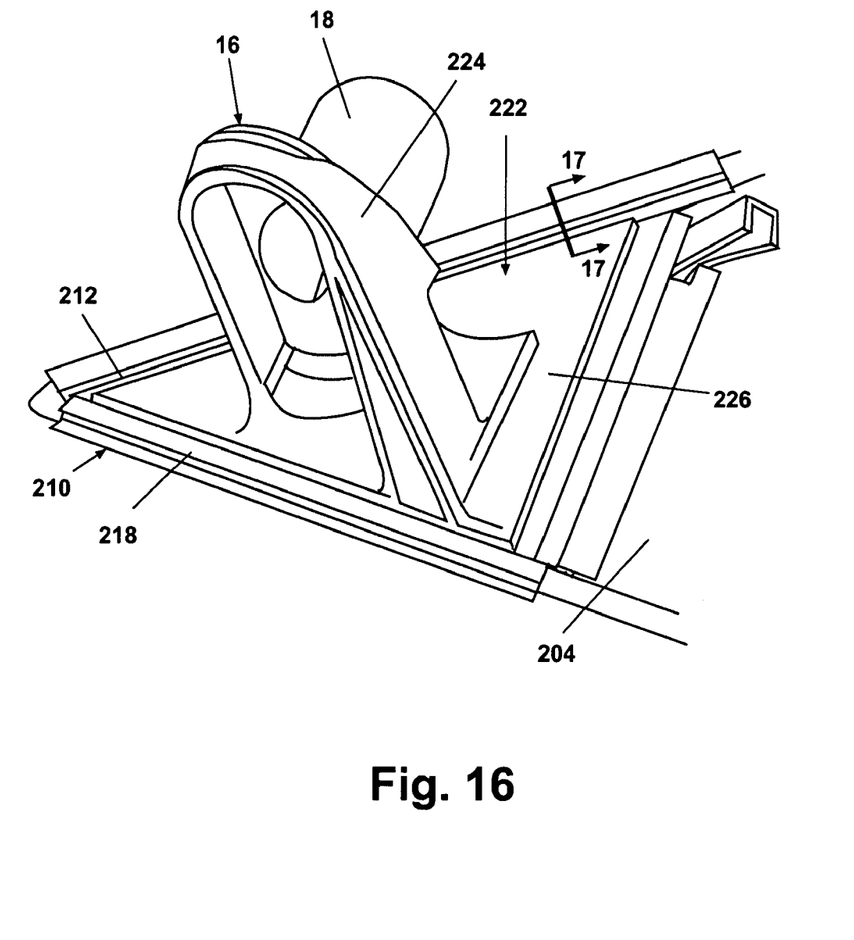
FIG. 16 is a perspective view of the improved mirror support arm, including a support base sleeve and a trim frame in an assembled configuration.

As indicated in FIG. 16, the seals 212-218 overlie the base cover 228. Alternatively, the seals 212-218 can be attached directly to the underside of the mounting panel cover 234, as illustrated in FIGS. 11 and 12 by seals 142. FIG. 11 illustrates seals extending along the inclined edge 136, the vertical edge 138, and the bottom edge 140. FIG. 12 illustrates an alternative configuration comprising a seal 142 extending only along the vertical edge 138. Sealing of the inclined edge 136 and the bottom edge 140 would be accomplished by a trim frame 210 in a manner similar to that previously described.

Figure 17:
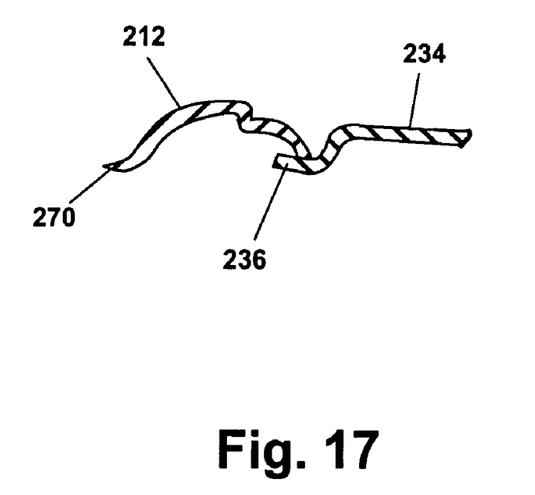
FIG. 17 is a cross-sectional view of a portion of the trim frame taken along line 17-17 of FIG. 16.

The mirror assembly 12 is assembled as follows. The trim frame 210 is installed to the corner panel 206 in operative communication with the mounting surface 170. The support base 130/222 is then mounted to the mounting surface 170 by inserting the hooks 148 into the sockets 172 as previously described, at the same time positioning the inclined seal 212 and the bottom seal 218 over the associated edges of the support base 130/222, as shown in FIGS. 16 and 17. The support base 130/222 is then secured to the mounting surface 170 with the threaded fastener 146. The base sleeve 229 is then attached to the support base 130 and closed with the mirror base panel 230 as previously described. If the base sleeve 229 is provided with integral seals, as shown in FIGS. 11-12, the mirror housing 22 is attached to the post 18 extending through the support base cover 228, and the trim frame 210 is not utilized. The base sleeve 229 is also secured to the mounting surface 170 and/or the support base 130/222 through well-known mounting means such as studs or snaps.

The mirror assembly described herein and shown in FIGS. 11-16 provides an improved fit of the mirror assembly to the vehicle while increasing the ease of assembly. The support base can be separately attached to the vehicle, thereby minimizing the difficulties associated with attaching the entire mirror assembly, with its attendant size and weight, securely and properly to the vehicle. Attaching the support base first enables the assembler to attach a component of much smaller size and weight, thereby facilitating the proper attachment of the mirror assembly to the vehicle. The trim frame provides for reduced wind noise and improved moisture and dust resistance between the mirror assembly and the vehicle trim. Interior seals are also eliminated, thereby reducing cost and assembly time.

While the invention has been specifically described in connection with certain specific embodiments thereof, it is to be understood that this is by way of illustration and not of limitation. Reasonable variation and modification are possible within the scope of the foregoing description and drawings without departing from the spirit of the invention.

The invention claimed is:

1. A side-mounted rearview mirror assembly comprising a mirror housing enclosing a mirror case supporting a reflective element, and a support base having a mounting panel for mounting the mirror assembly to a mounting surface of a vehicle, the mirror assembly comprising;
   at least one hook assembly extending from the mounting panel, configured to engage at least one socket adapted for mounting the mirror assembly to a vehicle by translating said mounting panel relative to said at least one socket;
   a resilient seal assembly extending along at least a portion of the perimeter of the support base for engaging a vehicle; and
   at least one boss extending from the mounting panel and at least one locator pad adapted to be extendable from a vehicle mounting surface, the at least one boss being adapted for movement away from a vehicle mounting surface during translation of the at least one boss along an at least one locator pad and the mounting panel along a mounting surface.

2. The side-mounted rearview mirror assembly of claim 1 wherein the at least one hook assembly comprises three hook assemblies and the at least one socket comprises three sockets.

3. The side-mounted rearview mirror assembly of claim 1 wherein the at least one hook assembly comprises a pair of hooks.

4. The side-mounted rearview mirror assembly of claim 1 wherein the resilient seal assembly comprises a trim frame adapted for mounting over the support base when the mirror is mounted to a vehicle.

5. The side-mounted rearview mirror assembly of claim 1 wherein the resilient seal assembly comprises an integrated portion of the mounting panel.

6. The side-mounted rearview mirror assembly of claim 1, and further comprising a support base cover assembly for covering the support base when the mirror is mounted to a vehicle.

7. The side-mounted rearview mirror assembly of claim 6 wherein the support base cover assembly comprises a base sleeve and a support base panel removable from the base sleeve.

8. The side-mounted rearview mirror assembly of claim 1 wherein the mounting panel can be translated along a mounting surface toward a front portion of a motor vehicle.

9. The side-mounted rearview mirror assembly of claim 1 wherein the mirror case further comprises a pivot point at an outboard end thereof for adjusting the horizontal and vertical tilt of the mirror case.

10. The side-mounted rearview mirror assembly of claim 9, and further comprising a power pack mounted to an inboard end of the mirror case for adjusting the horizontal and vertical tilt of the mirror case about the pivot point.

11. The side-mounted rearview mirror assembly of claim 1, and further comprising an access opening in the mirror housing for gaining access to the interior of the mirror housing and a flexible, removable door for covering the access opening.

12. A vehicular mirror mounting system for mounting a vehicular mirror to a mounting surface of a vehicle, comprising:
   a mirror mounting panel adapted to receive a mirror head with a reflective element mounted therein, the mirror mounting panel having one of a hook and a socket directed in a forward direction with respect to a forward direction of travel of a vehicle, the socket comprising a locator pad positioned adjacent thereto and the hook having a boss in spaced relationship thereto; and
   a vehicle mounting surface adaptable to have the other of a hook and a socket directed in a rearward direction with respect to a forward direction of travel of a vehicle, the socket comprising a locator pad positioned adjacent thereto and the hook having a boss in spaced relationship thereto;
   wherein the hook is adapted to be slidably received within the socket when the hook and socket are operably aligned with one another and the mirror mounting panel is moved forwardly with respect to a vehicle mounting surface so that the hook can be received within the socket; and
   wherein the locator pad is adaptable for spaced relationship to the socket and adapted to be in register with the boss upon mounting of the mirror mounting panel to a mounting surface, and can create tension therebetween for further securement of a mounting between these components.

13. A vehicular mirror mounting system for mounting a vehicular mirror assembly to a mounting panel of a vehicle, the system comprising:
   a mirror mounting panel adapted for coupling with a mirror assembly housing having a reflective element mounted therein, the mirror mounting panel including one of a hook and a socket characterized by a first orientation;
   a vehicle mounting panel adaptable to include the other of the hook and the socket, the other of the hook and the socket characterized by a second orientation complementary to the first orientation to enable coupling of a hook with a socket;
   a locator pad disposed adjacent the socket for facilitating a coupling of the mirror mounting panel with a vehicle mounting panel, the locator pad extending away from one of the mirror mounting panel and a vehicle mounting panel, and having an inclined portion; and
   a boss disposed adjacent the hook for facilitating a coupling of the mirror mounting panel with a vehicle mounting panel, the boss extending away from the other of the mirror mounting panel and a vehicle mounting panel, and having an inclined portion;
   wherein the hook is adapted to be slidably received within the socket when the hook and socket are cooperatively aligned and the mirror mounting panel is translated along a vehicle mounting panel so that the hook can be received within the socket.

14. The system of claim 13 and further comprising at least one fastener for fixedly mounting the mirror mounting panel to a vehicle mounting panel.

15. The system of claim 14 wherein the at least one fastener comprises at least one threaded fastener for extending through alignable apertures in the mirror mounting panel and a vehicle mounting panel.

16. The system of claim 13, and further comprising at least one seal mounted to at least one peripheral edge of the mirror mounting panel.

17. The system of claim 16 wherein the at least one seal is integrally formed with the mirror mounting panel.

18. The system of claim 17 wherein the at least one seal comprises a flip seal.

19. The system of claim 16 wherein the at least one seal forms an effective barrier against wind and water ingress upon mounting of the mirror mounting panel to a vehicle mounting panel as a result of receipt of the hook within the socket.

20. The system of claim 13 wherein the inclined face of the locator pad and the inclined face of the boss are adaptable for slidable engagement during relative translation of the mirror mounting panel along a vehicle mounting panel to induce opposed tensile forces in the hook and the socket.

* * * * *